(12) United States Patent
Yamane

(10) Patent No.: US 7,763,796 B2
(45) Date of Patent: Jul. 27, 2010

(54) ELECTRIC CONNECTION BOX AND MANUFACTURING METHOD OF ELECTRIC CONNECTION BOX

(75) Inventor: Shigeki Yamane, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 328 days.

(21) Appl. No.: 11/988,405

(22) PCT Filed: Jan. 25, 2007

(86) PCT No.: PCT/JP2007/051165

§ 371 (c)(1),
(2), (4) Date: Jan. 7, 2008

(87) PCT Pub. No.: WO2007/086460

PCT Pub. Date: Aug. 2, 2007

(65) Prior Publication Data

US 2009/0038825 A1    Feb. 12, 2009

(30) Foreign Application Priority Data

Jan. 30, 2006  (JP) .............................. 2006-021346
Jan. 30, 2006  (JP) .............................. 2006-021347

(51) Int. Cl.
*H05K 5/02*    (2006.01)

(52) U.S. Cl. .............................. 174/17 SF; 174/17 LF; 361/717

(58) Field of Classification Search .............. 174/17 SF, 174/17 LF, 8; 381/409, 410; 361/159, 708, 361/717

See application file for complete search history.

(56) References Cited

U.S. PATENT DOCUMENTS

| 6,207,892 | B1 * | 3/2001 | Lucey, Jr. ............... 174/17 LF |
| 6,372,983 | B1 * | 4/2002 | Knaggs .................. 174/17 LF |
| 7,623,349 | B2 * | 11/2009 | Refai-Ahmed et al. ...... 361/719 |
| 2004/0214458 | A1 | 10/2004 | Maebashi | |

FOREIGN PATENT DOCUMENTS

| JP | A 07-335406 | 12/1995 |
| JP | A-2003-31977 | 1/2003 |
| JP | A 2003-031979 | 1/2003 |
| JP | A-2004-159397 | 6/2004 |
| JP | A 2004-343994 | 12/2004 |
| JP | A-2005-210804 | 8/2005 |
| JP | A-2006-14576 | 1/2006 |

* cited by examiner

*Primary Examiner*—Dhiru R Patel
(74) *Attorney, Agent, or Firm*—Oliff & Berridge, PLC

(57) ABSTRACT

One aspect of the present invention can include an electric connection box including a housing, a circuit component positioned in the housing, a filler material in the housing enclosing the circuit component, a filling inlet configured to receive the filler material, the filling inlet positioned at an upper part of a wall portion of the housing, a filling cylindrical portion formed in the housing and connected to the filling inlet and extending in a direction to a bottom portion of the housing.

9 Claims, 19 Drawing Sheets

US 7,763,796 B2

ELECTRIC CONNECTION BOX AND MANUFACTURING METHOD OF ELECTRIC CONNECTION BOX

TECHNICAL FIELD

The present disclosure relates to an electric connection box and a method of manufacturing an electric connection box.

BACKGROUND

As an electric connection box for controlling conduction/shutoff of in-vehicle electrical components mounted on a vehicle, like the one described in Patent Document 1 has been known. This electric connection box is manufactured by loading a circuit component with its body faced vertically in a case in the shallow disk state, blocking an opening of the case with a cover and filling a filler material through a passage hole formed in the cover so that the circuit component is buried (See FIG. 8 of Patent Document 1). Heat generated from the circuit component is transmitted to the case and a wall surface of the cover via the filler material and radiated to the outside the electric connection box.

[Patent Document 1]
Japanese Patent Laid-Open No. 2003-31979

SUMMARY

However, according to the above construction, air may remain in the case depending on the filling method, and there is a fear that a gap is formed between the cover wall surface and the filler material. Then, the heat generated from the top face of the body in the circuit component becomes hard to be transmitted to the cover and as a result, heat dissipation capability of the electric connection box might be lowered.

Thus, there is a need in the art for an electric connection box and a manufacturing method of an electric connection box with improved heat dissipation capability.

SUMMARY OF THE PRESENT INVENTION

One aspect of the present invention can include an electric connection box including a housing, a circuit component positioned in the housing, a filler material in the housing enclosing the circuit component, a filling inlet configured to receive the filler material, the filling inlet positioned at an upper part of a wall portion of the housing, a filling cylindrical portion formed in the housing and connected to the filling inlet and extending in a direction to a bottom portion of the housing.

BRIEF DESCRIPTION OF THE DRAWINGS

Embodiments in accordance with the invention will be described in detail with reference to the following figures wherein.

DETAILED DESCRIPTION

Figure 1:
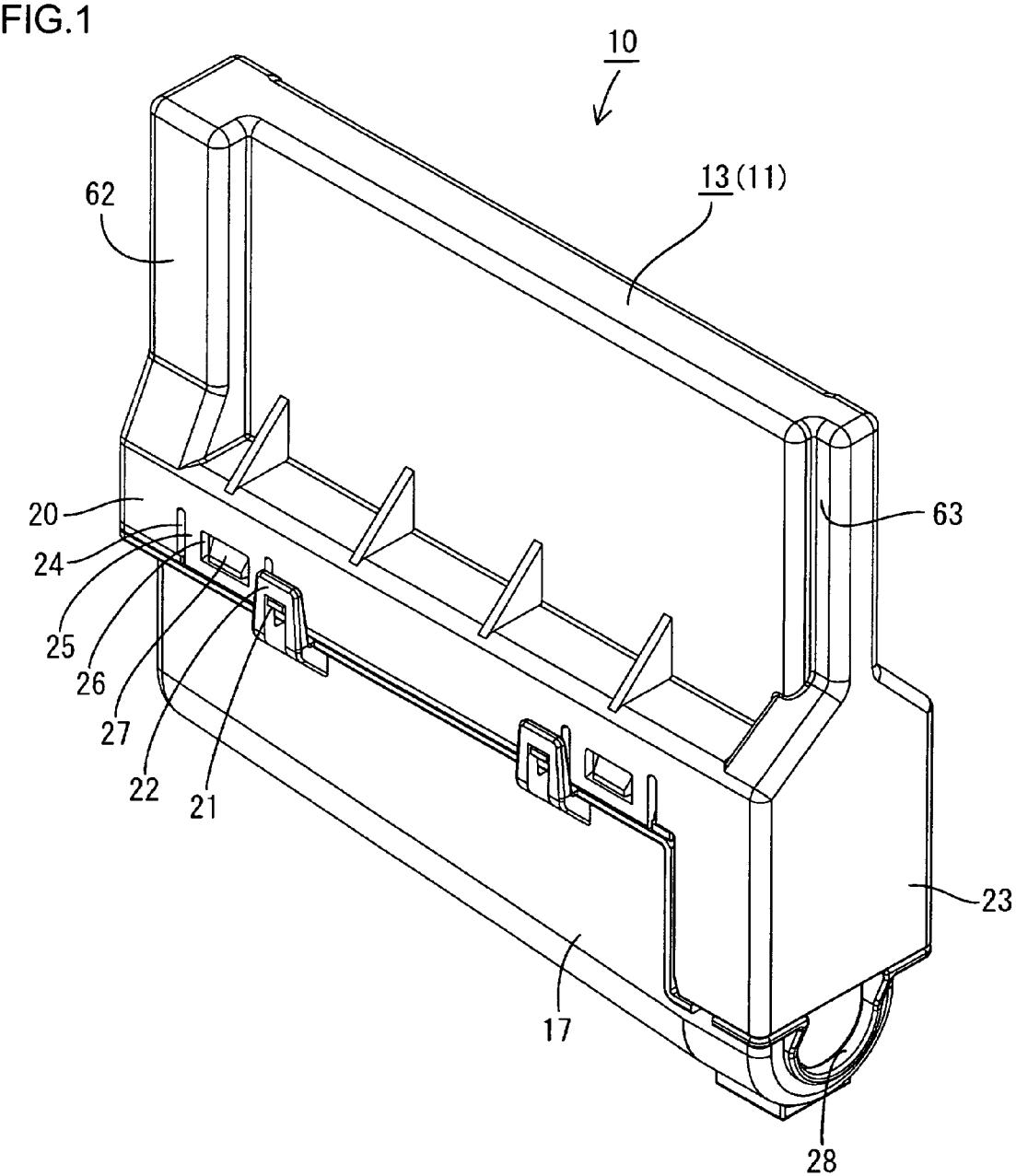
FIG. 1 is a perspective view of an electric connection box according to a structural example of the present invention.

A structural example to which the present invention is applied to an electric connection box 10 for a vehicle will be described referring to FIGS. 1 to 19. This example is connected between a power source such as a battery (not shown) and in-vehicle electrical components (not shown) such as a head lamp, a wiper and the like for conduction/shutoff control of the various electrical components. This electric connection box 10 is comprised by accommodating a circuit component 12 in a housing 11 in a flat shape. The housing 11 comprises a case 13 having an opening and formed in a flat shape and a connector housing (corresponding to a lid member according to the present invention) 15 blocking the opening and provided with a hood portion 14. The case 13 is filled with a filler material 16 so as to enclose the circuit component 12. Also, in the housing 11, a cover 17 covering the hood portion 14 of the connector housing 15 is mounted. The electric connection box 10 can be mounted to a vehicle (not shown) in an arbitrary attitude and can be used by being mounted on a vehicle in an attitude with the cover 17 faced downward as shown in FIG. 1, for example.

(Case)

The case 13 is made of a synthetic resin and formed in a flat shape, opening downward. At a lower end of the case 13, a stepped portion 20 is formed expanding outwardly in the right and left direction in FIG. 3. On the outer face of the stepped portion 20, pawls 21 projecting outward are formed, and by its engagement with pawl catches 22 of the cover 17, which will be described later, the case 13 and the cover 17 are assembled. In the stepped portion 20, a right end in FIG. 2 is formed suspending downward to become a wire guiding portion 32 for guiding an electric wire, not shown, when the cover 17 is assembled.

Figure 2:
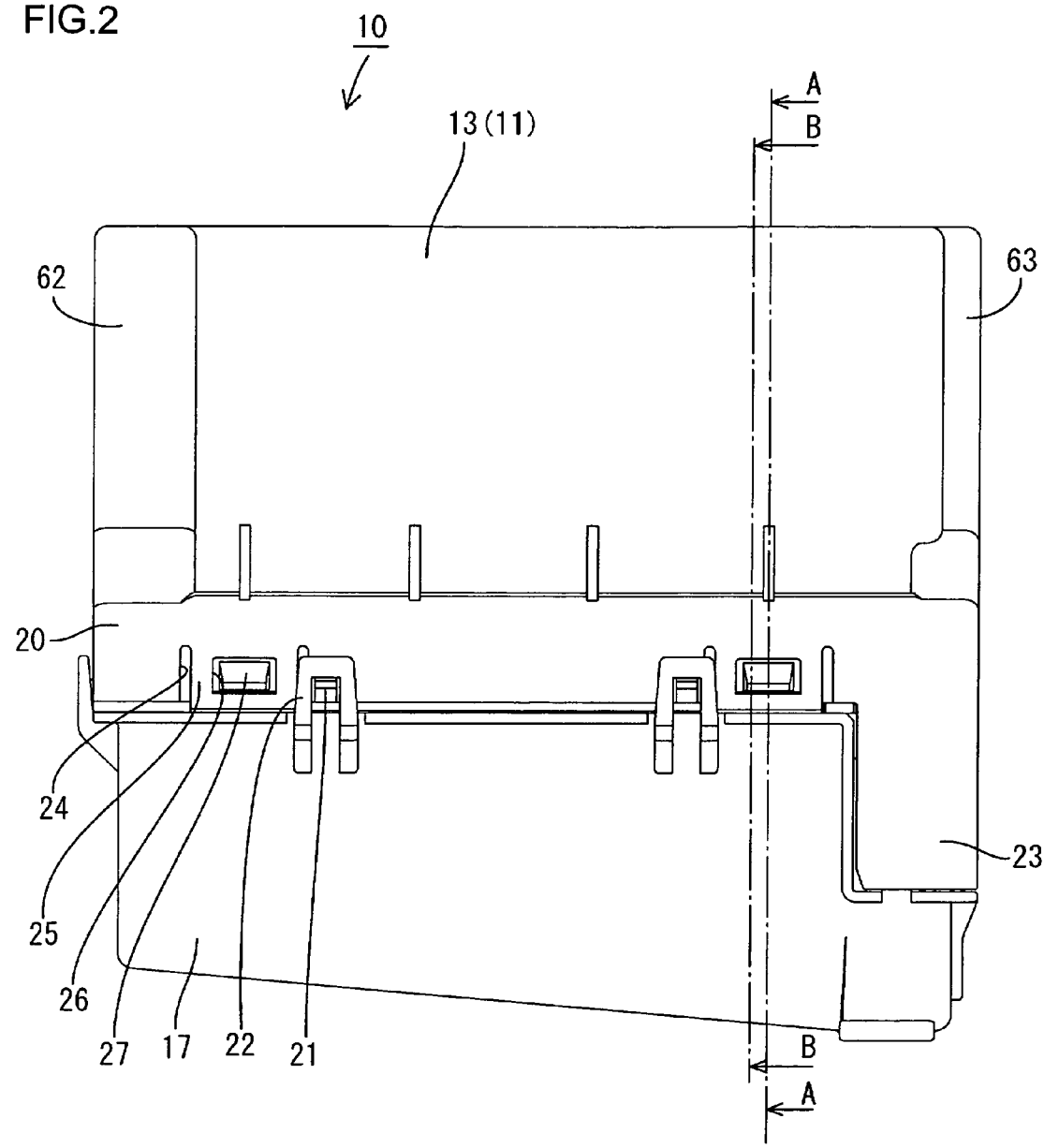
FIG. 2 is a front view of the electric connection box.

As shown in FIG. 2, at the lower end of the stepped portion 20 in the case 13, a plurality of elastic lock strikes 25 capable of outward flexural deformation are formed by slits 24 formed from an opening edge of the case 13 upward. The elastic lock strike 25 has a lock recessed portion 26 penetrating the elastic lock strike 25 in the thickness direction. By engagement between the elastic lock strike 25 and a lock tongue 27 of the connector housing 15, which will be described later, the case 13 and the connector housing 15 are assembled.

Figure 3:
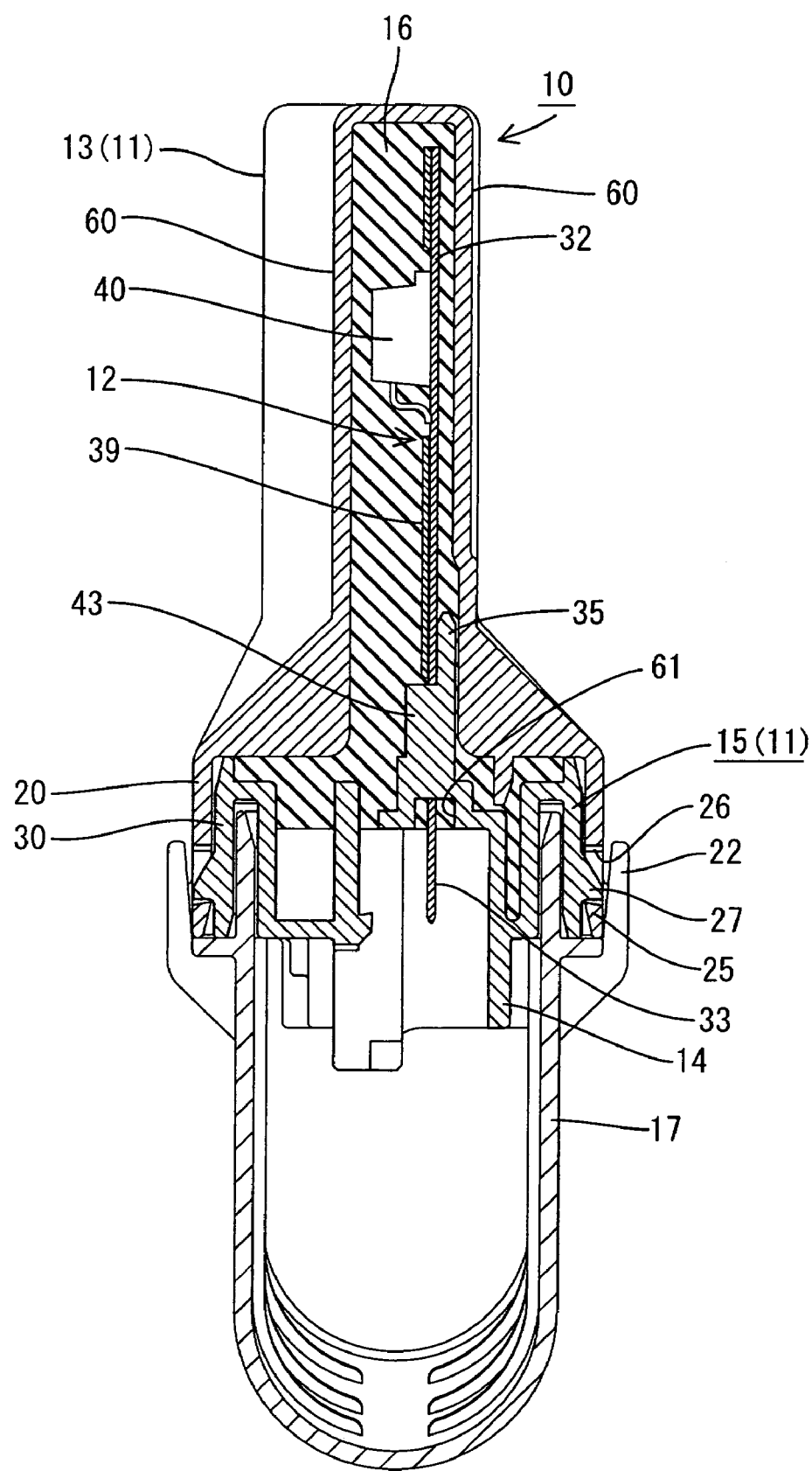
FIG. 3 is a sectional view by A-A line in FIG. 2.

Above the stepped portion 20 in FIG. 3 in the case 13, a pair of faces along the body of the circuit component 12 are formed in the flat shape. The pair of faces are made as radiation surfaces 60 for radiating heat generated from the circuit component 12 to the outside.

At the end in the diagonally left depth in FIG. 1 in the case 13, a filling cylindrical portion accommodation section 62 for accommodating a filling cylindrical portion 19, which will be described later, is formed extending vertically and projecting toward the diagonally left front side in FIG. 1. Also, the end on diagonally right front side in FIG. 1 in the case is formed in the recessed state toward the diagonally right depth in FIG. 1 in the case to become a guide-rail accommodation portion 63 for accommodating a guide rail 31 of the connector housing 15, which will be described later.

(Cover)

The cover 17 is made of a synthetic resin, has an opening above and is formed in the shape covering the lower end of the case 13 from below. The lower edge portion of the cover 17 is formed while being inclined downward toward the right side in FIG. 2. At the right end in FIG. 2 in the lower end of the cover 17, a wire leading-out port 28 for leading out a wire, not shown, is formed (See FIG. 1) so that the electric wire is led out through a space formed with a wire guiding portion 23 of the case 13. At the upper end of the cover 17, the pawl catch 22 to be engaged with the pawl 21 of the case 13 is formed. By elastic engagement between the pawl catch 22 and the pawl 21, the case 13 and the cover 17 are assembled.

(Connector Housing)

Figure 6:
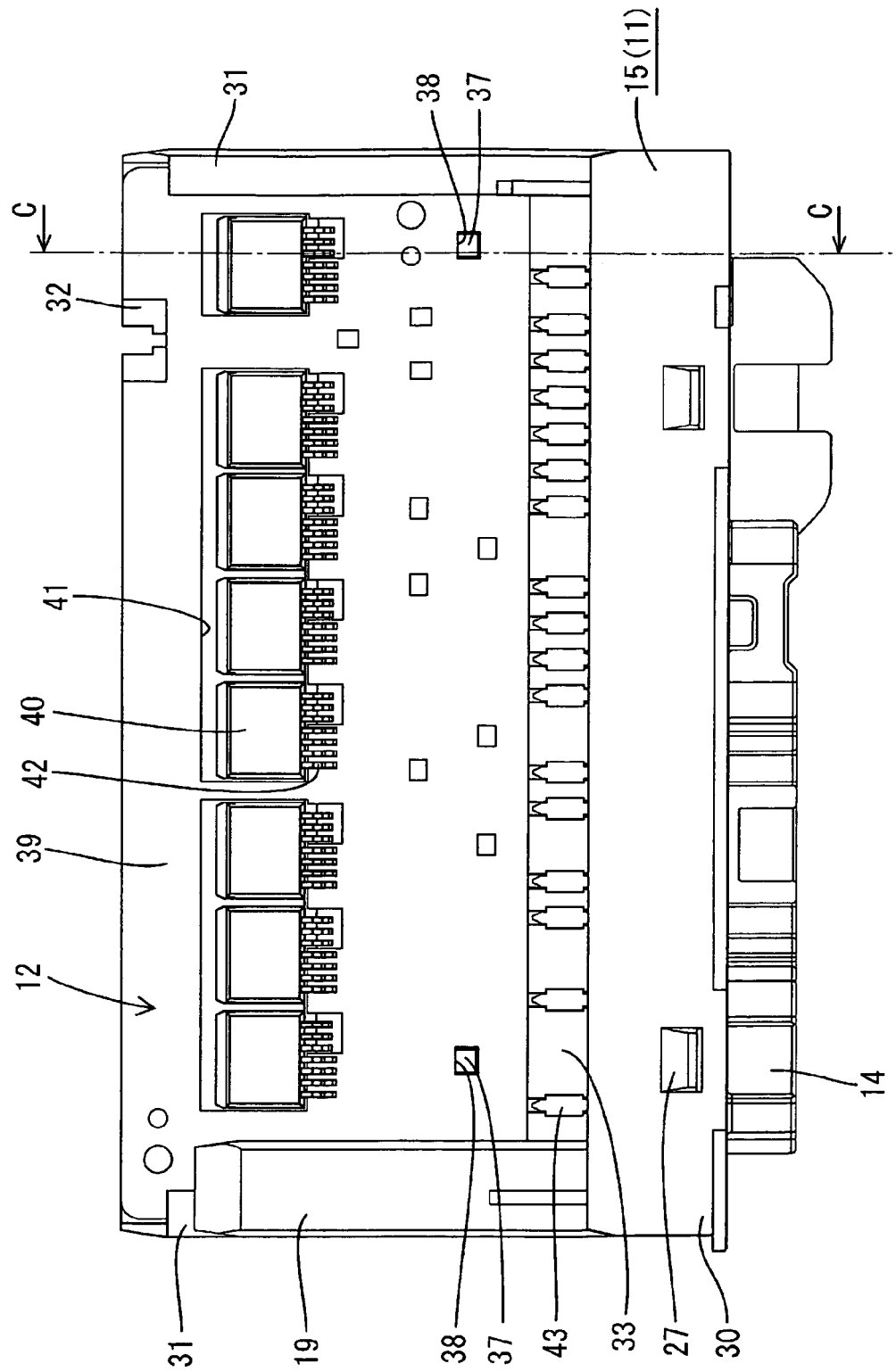
FIG. 6 is a front view illustrating a state where a connector housing and the circuit component are assembled.

The connector housing 15 is made of a synthetic resin. As shown in FIG. 6, the connector housing 15 comprises a main body 30 substantially forming a rectangular solid and a pair of guide rails 31 extending upward from both right and left ends in FIG. 6 of the main body 30 for guiding the circuit component 12 when the circuit component 12 and the connector housing 15 are assembled.

On the outer face of the main body 30, the lock tongues 27 to be engaged with lock recessed portions 26 provided at the elastic lock strike 25 of the aforementioned case 13 are projected outwardly.

As shown in FIG. 3, the plurality of hood portions 14 opened downward are formed on the lower face of the main body 30 and become capable of fitting with a counterpart, not shown. To the counterpart, an electric wire (not shown) is connected. The electric wire is guided to the wire guiding portion 23 of the case 13 and led out of the electric connection box 10 from between the electric wire guiding portion 23 of the cover 17 and the electric wire leading-out port 28.

Figure 14:
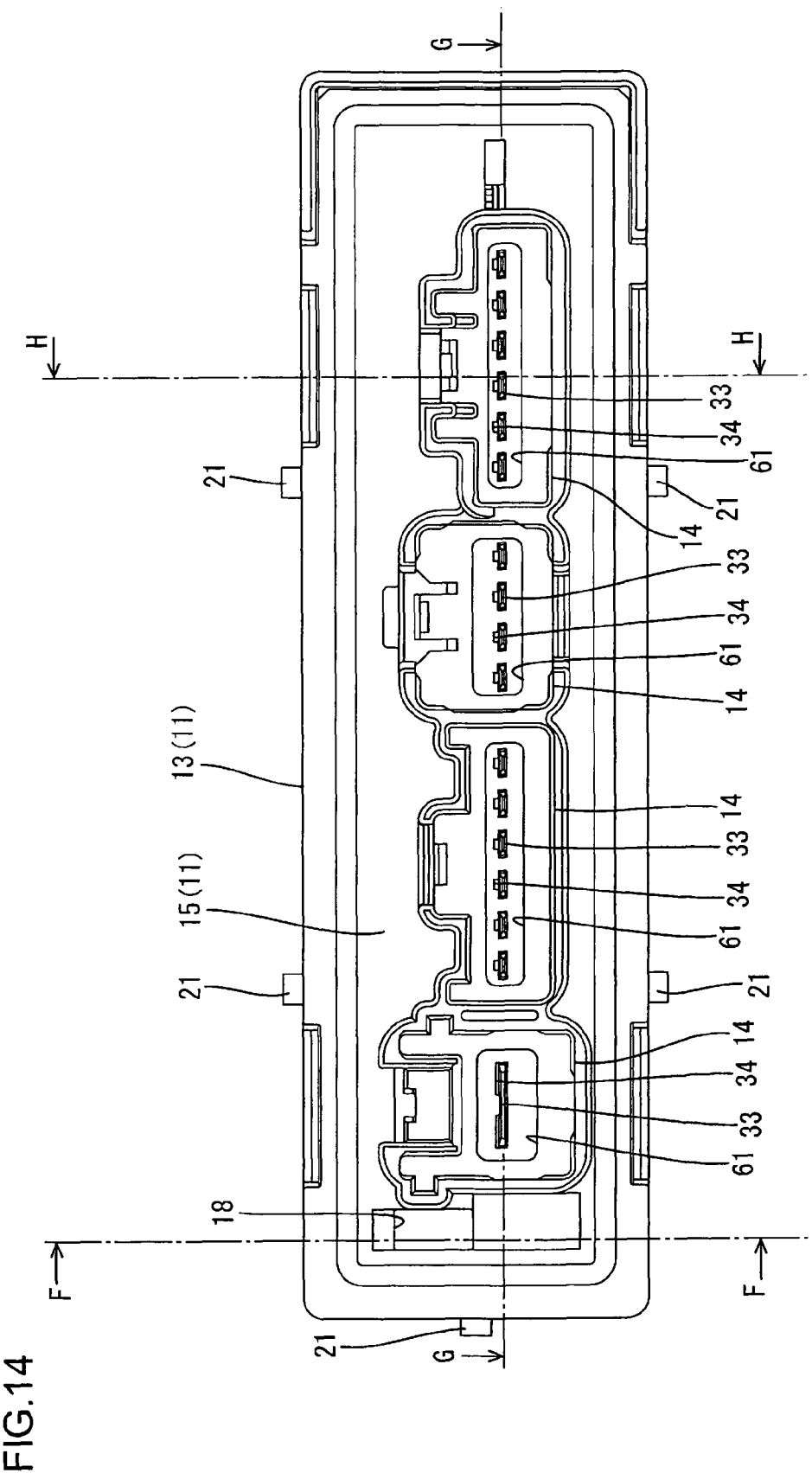
FIG. 14 is a bottom view illustrating a state where the connector housing and the case are assembled.
Figure 16:
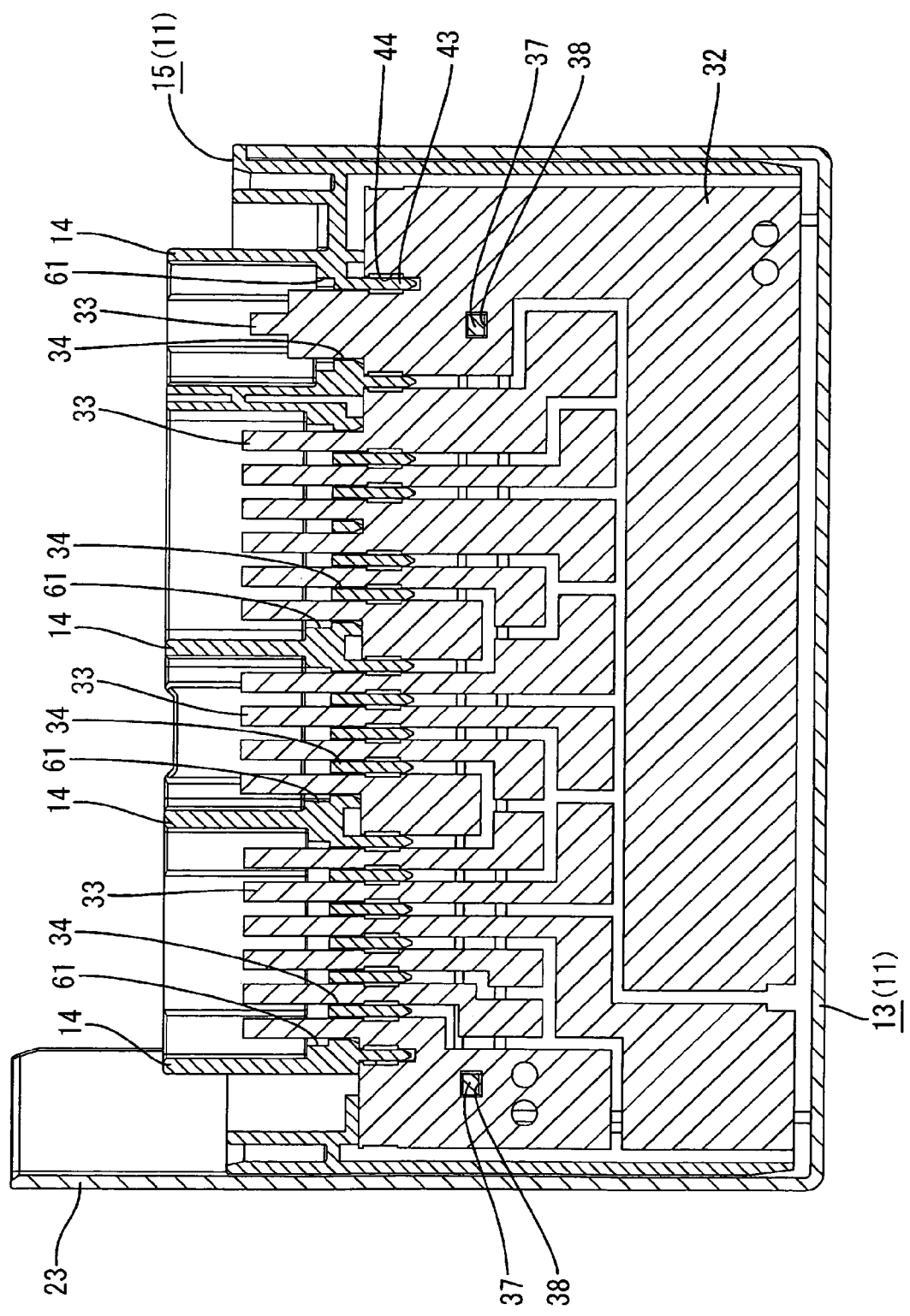
FIG. 16 is a sectional view by G-G line in FIG. 14.
Figure 17:
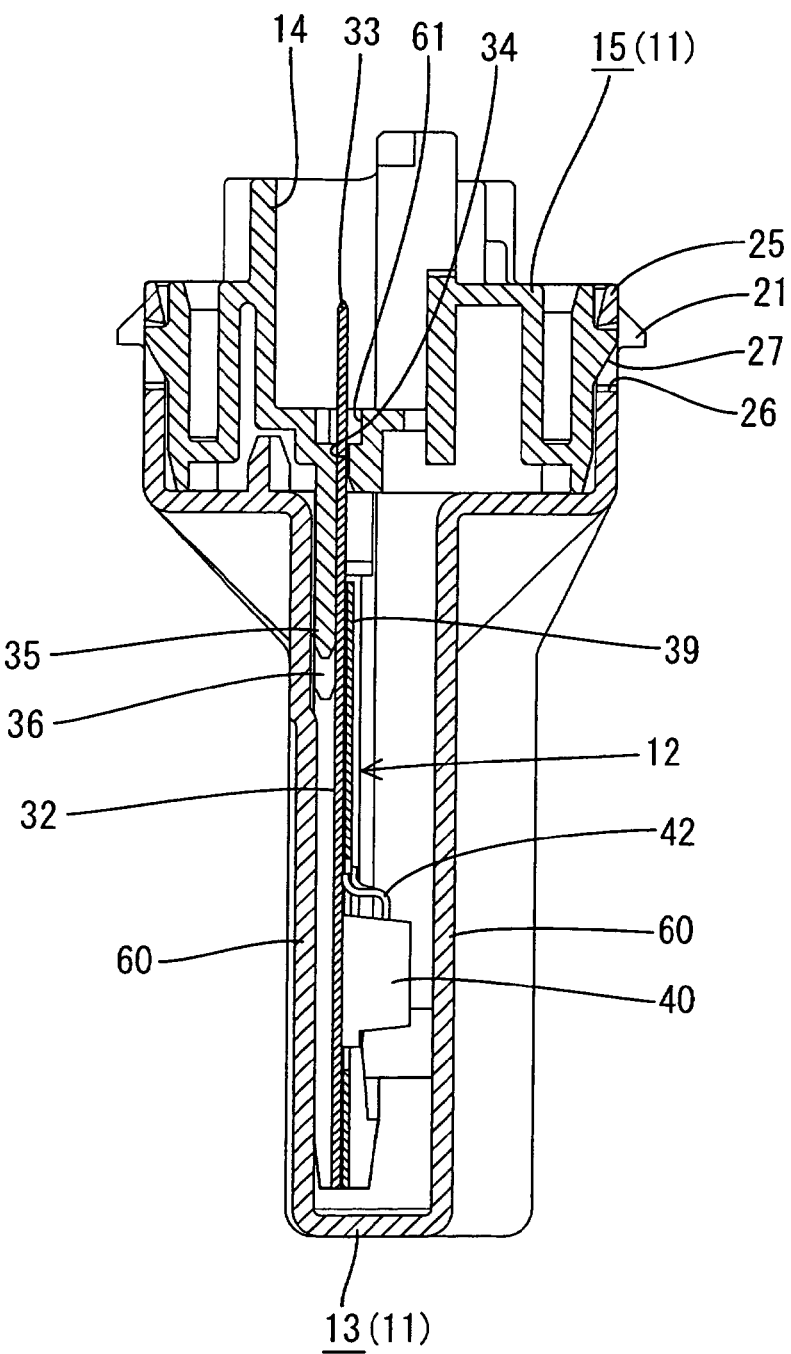
FIG. 17 is a sectional view by H-H line in FIG. 14.

As shown in FIGS. 14, 16 and 17, recessed portions 61 are formed on a wall at a depth of the hood portion 14. On the bottom wall of the recessed portion 61, passage holes 34 through which an extended portion 33 of a bus bar 32 in the circuit component 12 is passed, which will be described later, are formed penetrating vertically. The passage hole 34 also functions as a recess hole through which air in the case 13 escapes when the filler material 16 is filled in the case 13.

When the filler material 16 is filled in the case 13 to a predetermined liquid level, the filler material 16 flows out of the passage holes 34 into the recessed portions 61 as will be described later. By this, whether or not the filler material 16 is filled to the predetermined level can be checked. The filler material 16 flowing out of the passage holes 34 is accommodated in the recessed portions 61 so that it does not flow out to the hood portion 14. By this, since the filler material 16 is interposed at the fitting face with the counterpart, a fitting defect can be prevented.

Figure 4:
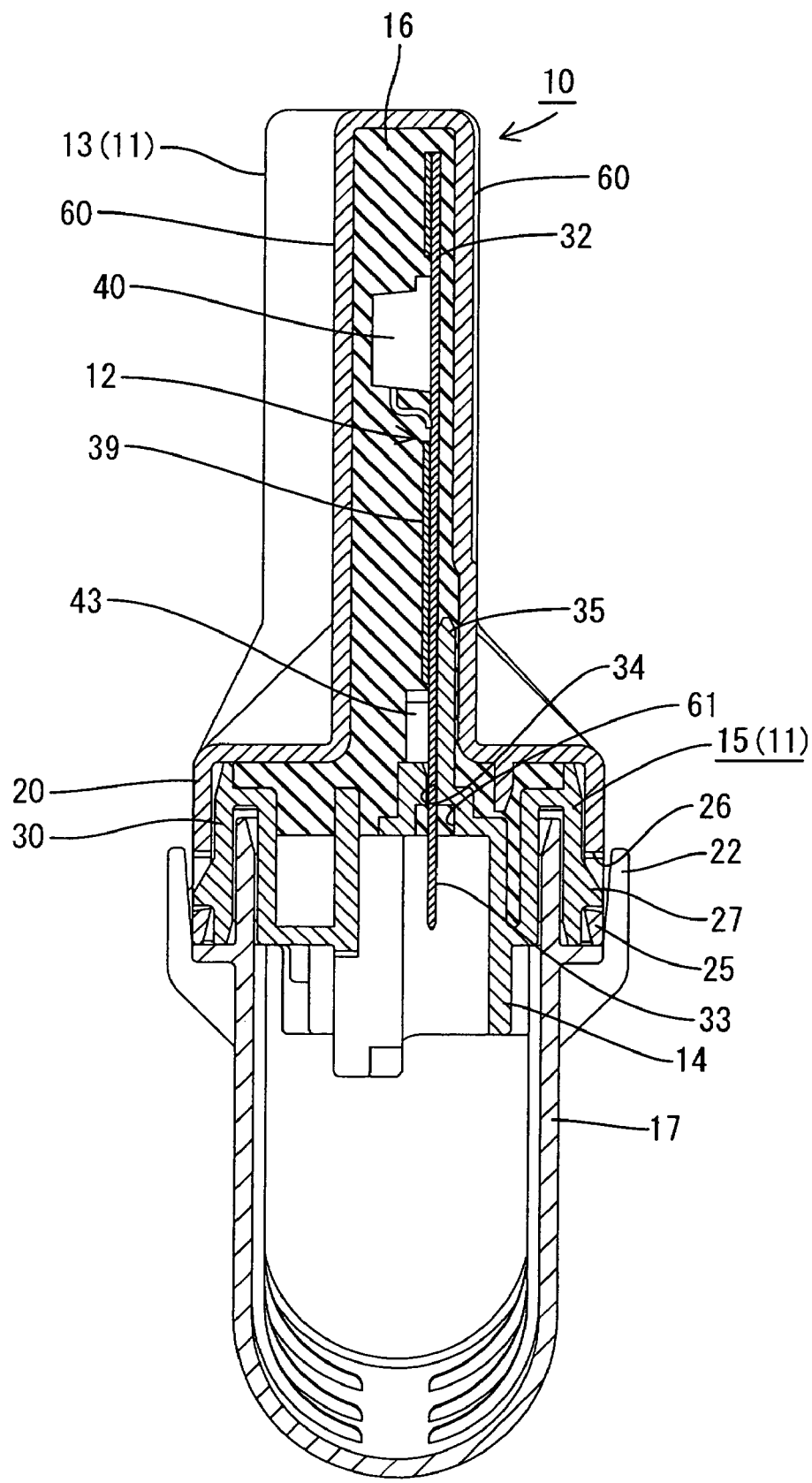
FIG. 4 is a sectional line by B-B line in FIG. 3.
Figure 8:
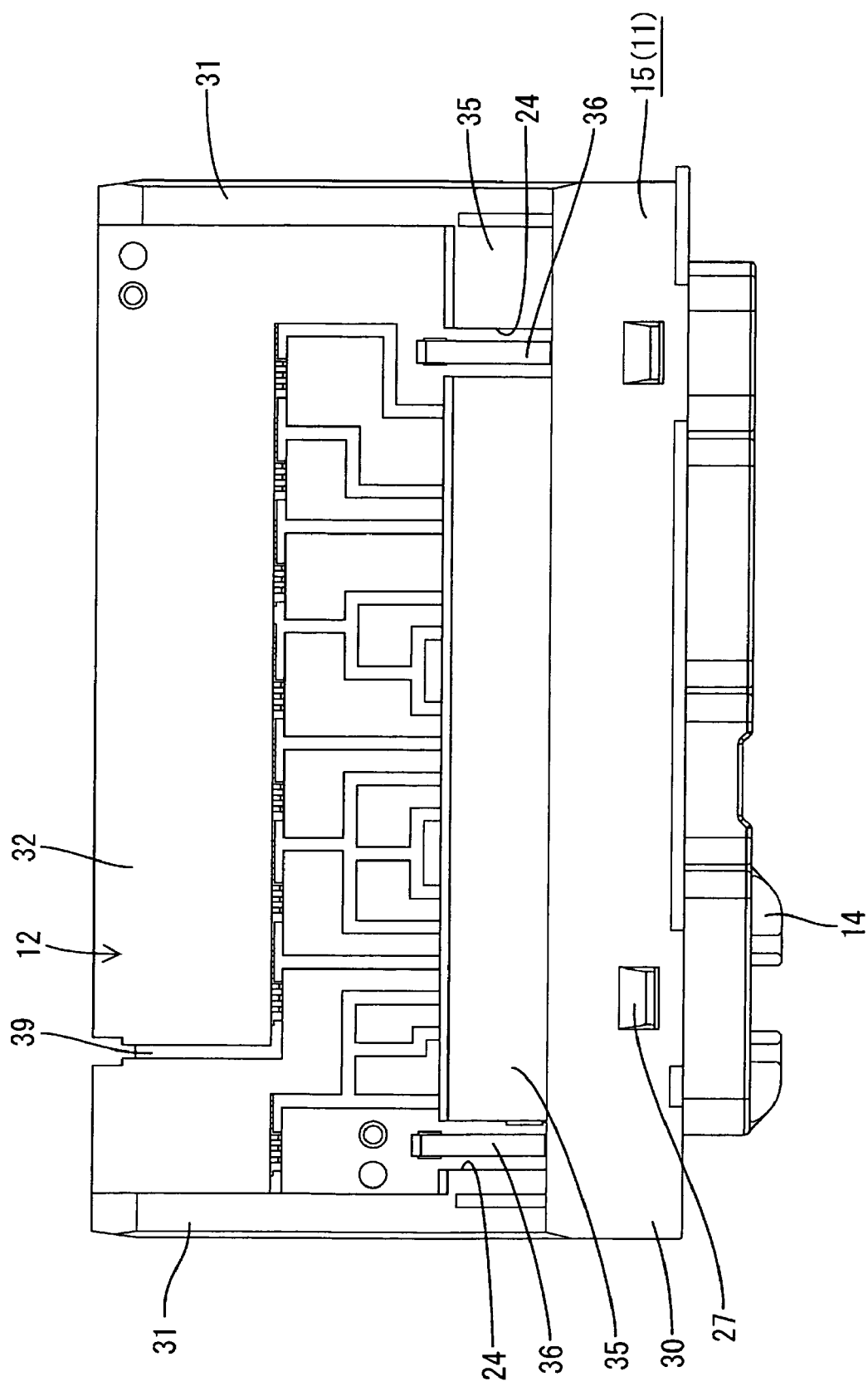
FIG. 8 is a rear view illustrating a state where the connector housing and the circuit component are assembled.

On the top face of the main body 30, a receiving plate portion 35 is formed extending upward from the right edge of the passage hole 34 in FIG. 4 for receiving the extended portion 33 of the bus bar 32 from the right side in FIG. 4. As shown in FIG. 8, the receiving plate portion 35 is formed over substantially the entire width in the right and left direction of the main body 30 in FIG. 8.

A rib 43 projecting to the left and extending upward is formed from the left side face in FIGS. 3 and 4 of the receiving plate portion 35. The rib 43 is formed between adjacent passage holes 34, and the adjacent extended portions 33 go into and between rib(s) 43. By heating and pressurizing the rib 43 while extended portions 33 is inserted into the passage hole 34, the rib 43 is deformed from left in FIG. 4 and brought into close contact with the extended portion 33 and holds the extended portion 33 onto the receiving plate portion 35. By this, removal of the extended portion 33 is prevented.

At a position close to both the right and left ends in FIG. 8 in the top face of the main body 30, a pair of elastic engagement portions 36 extending upward are formed in a region surrounded by a pair of slits 24 provided downward from the upper end edge of the receiving plate portion 35. The elastic engagement portion 36 is capable of elastic flexural deformation in the right and left direction in FIG. 7. At the upper end of the elastic engagement portion 36, an engagement tongue 37 is formed projecting to the left in FIG. 7 to be able to engage with an engagement hole 38 of the circuit component 12.

The guide rail 31 is substantially U-shaped when seen from above, and when both the right and left ends of the circuit component 12 is inserted into this substantially U-shaped surrounded space, the circuit component 12 can be guided vertically. Also, the guide rail 31 is brought into sliding contact with the inner wall of the guide-rail accommodation portion 63 of the case 13 when the connector housing 15 and the case 13 are assembled so as to guide the connector housing 15.

(Circuit Component)

Figure 5:
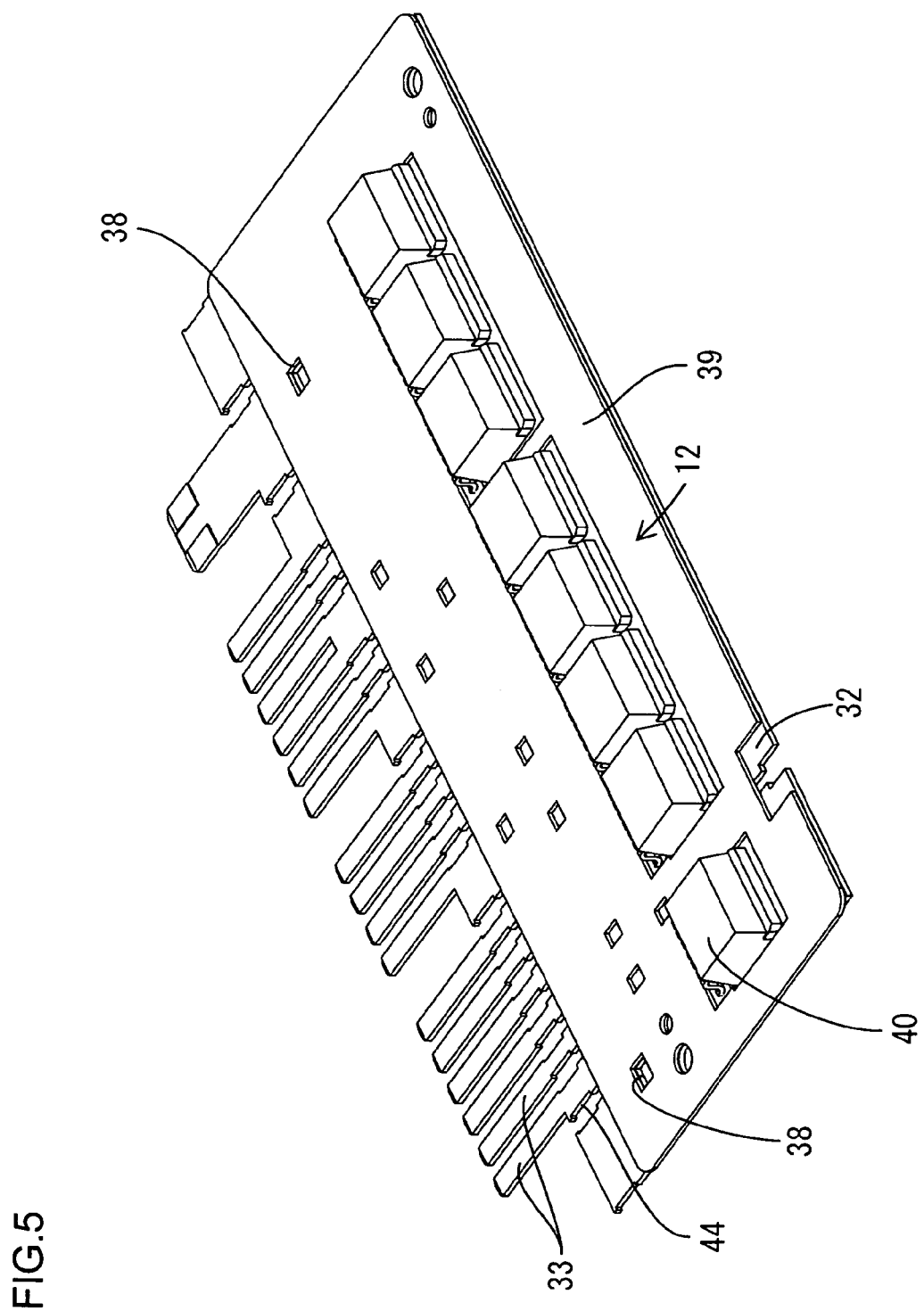
FIG. 5 is a perspective view illustrating a circuit component.
Figure 7:
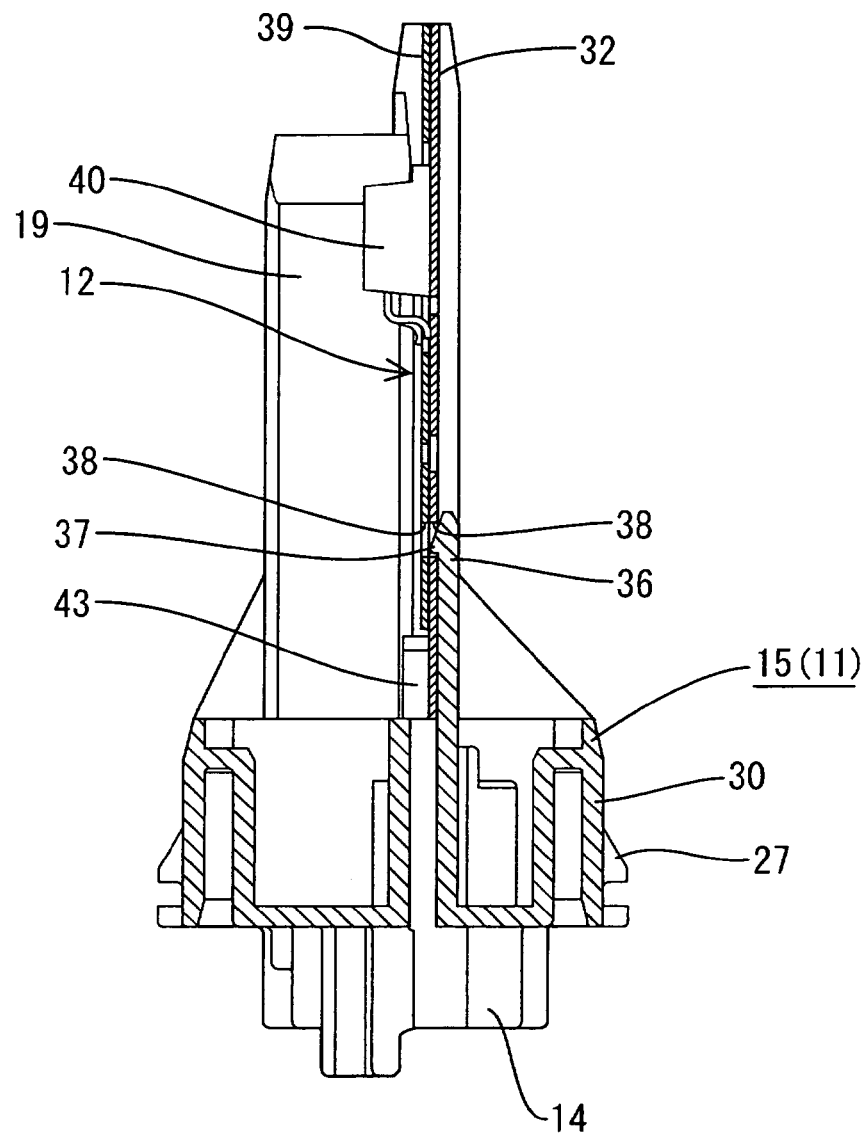
FIG. 7 is a sectional view by C-C line in FIG. 6.

As shown in FIG. 5, the circuit component 12 is comprised by mounting an electronic part 40 in a conducting path (not shown) formed by a print wiring technology, for example, on the surface of a circuit board 39 and the plurality of bus bars 32 brought into contact through an insulating adhesive layer (not shown) on the back face. An opening portion 41 is formed on the circuit board 39, and the bus bar 32 is exposed into the opening portion 41. Also, electronic parts 40 are accommodated within the opening portion 41. A connection terminal (not shown) is provided on the face of the bus bar 32 of this electronic part 40 so that the connection terminal and the bus bar 32 are connected to each other. Also, on the lower face in FIG. 7, in the electronic part 40, a plurality of connection terminals 42 are formed extending downward and then bent toward the circuit board 39 side substantially at a right angle. As shown in FIG. 7, a part of the connection terminals 42 provided at each of the electronic part 40 are connected to the bus bar 32 exposed from the opening, while the other connection terminals 42 are connected to the conducting path formed on the surface of the circuit board 39.

As shown in FIG. 4, the bus bar 32 is extended downward from the lower end edge of the circuit board 39 to become the extended portion 33. The lower part of the extended portion 33 is, as shown in FIGS. 3 and 4, inserted into the passage hole 34 formed in the wall at the depth of the hood portion 14 of the connector housing 15 to project into the hood portion 14 to be able to fit with the counterpart. The outer surface of the extended portion 33 is in contact with the passage hole 34.

As shown in FIGS. 6 and 8, both at the circuit board 39 and the bus bar 32, the engagement hole 38 is formed at a position corresponding to the engagement tongue 37 of the elastic engagement portion 36, which will be described later, in a state where the circuit component 12 is held at a normal position with respect to the connector housing 15. As shown in FIG. 7, when the engagement tongue 37 is engaged with the engagement hole 38, the circuit component 12 is prevented from being removed upward in FIG. 7. And the circuit board 39 is engaged with the elastic engagement portion 36 integrally formed at the connector housing 15 so as to be fixed to the connector housing 15.

As shown in FIG. 5, at a position in the extended portion 33 close to the circuit board 39, engagement recessed portions 44 are formed on the face opposing each other in the adjacent extended portions 33. As shown in FIG. 6, when the rib 43 is deformed, the rib 43 is expanded into the engagement recessed portion 44, and the rib 43 and the engagement recessed portion 44 are engaged with each other so that removal of the extended portion 33 is prevented.

Figure 10:
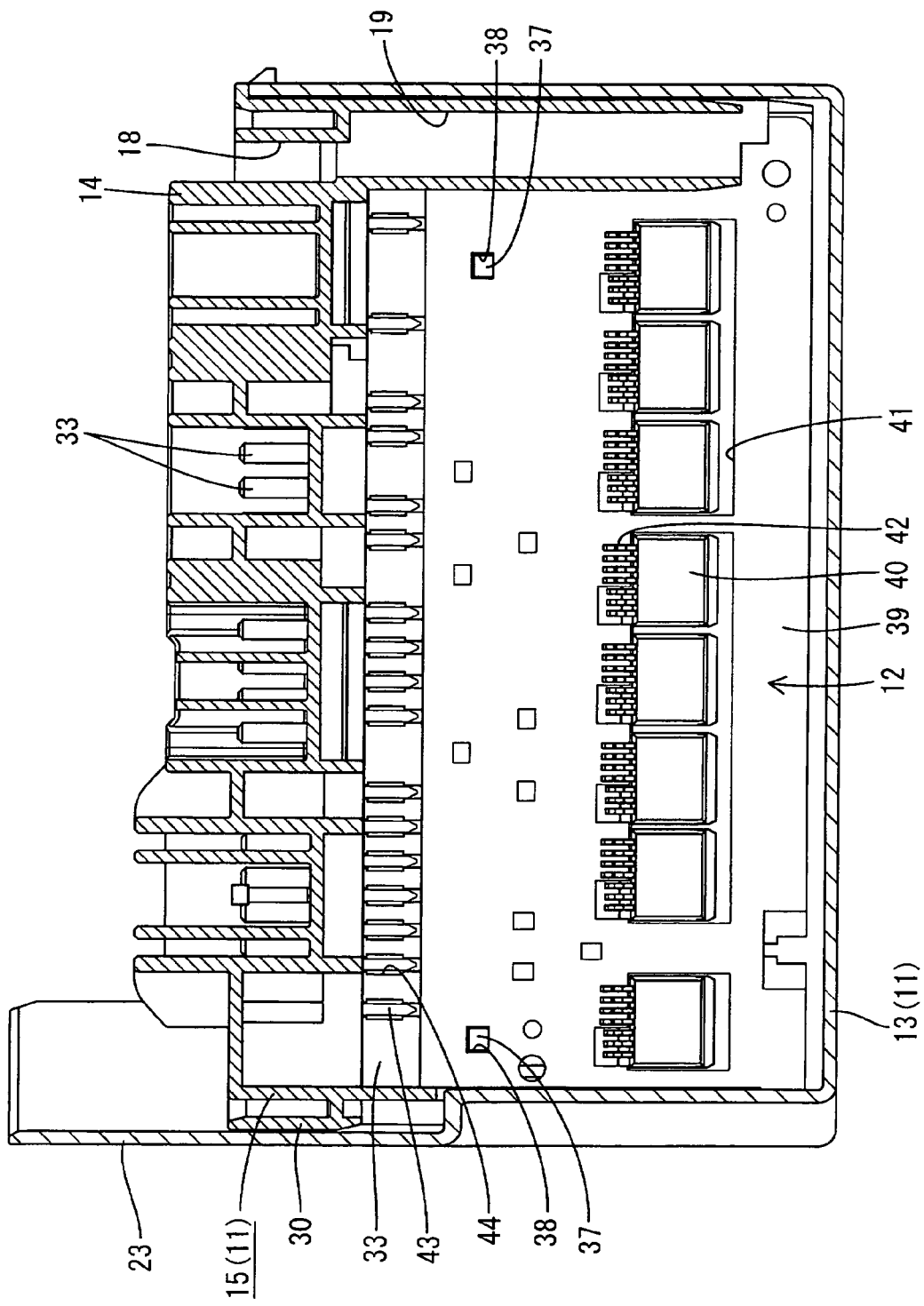
FIG. 10 is a sectional view by E-E line in FIG. 9.
Figure 18:
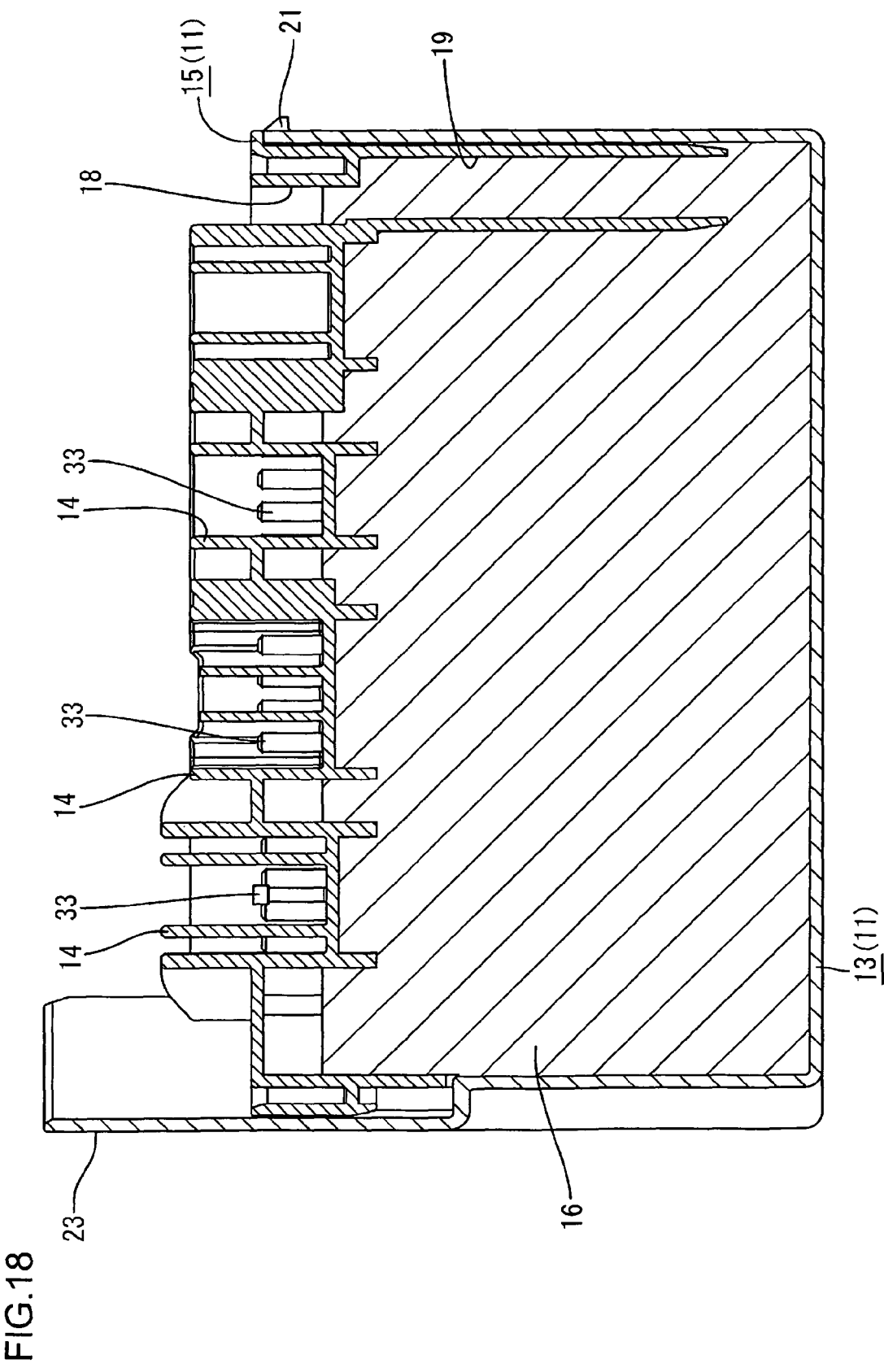
FIG. 18 is a sectional view by E-E line in FIG. 9 illustrating a state after a filler material is filled in the case.

As shown in FIGS. 3, 4 and 18, the case 13 is filled with the filler material 16 enclosing the entire circuit board 39 with the extended portion 33 left. The filler material 16 is filled in the case 13 in the attitude with the case 13 down and the connector housing 15 up as shown in FIGS. 10 and 18. Since the entire circuit board 39 is enclosed by this filler material 16, waterproof property of the circuit component 12 is ensured. Also, heat generated from the electronic part 40 and the bus bar 32 of the circuit component 12 is transmitted to the filler material 16 and radiated through the filler material 16 to the outside from the radiation surfaces 60 of the case 13.

In the main body 30 of the connector housing 15, the filling inlet 18 for filling the filler material 16 into the case 13 is formed, opening upward in FIG. 10, at the right end portion in FIG. 10. The section of the filling inlet 18 is substantially rectangular so that a space can be effectively used in the main body 30 substantially forming a rectangular solid.

Figure 9:
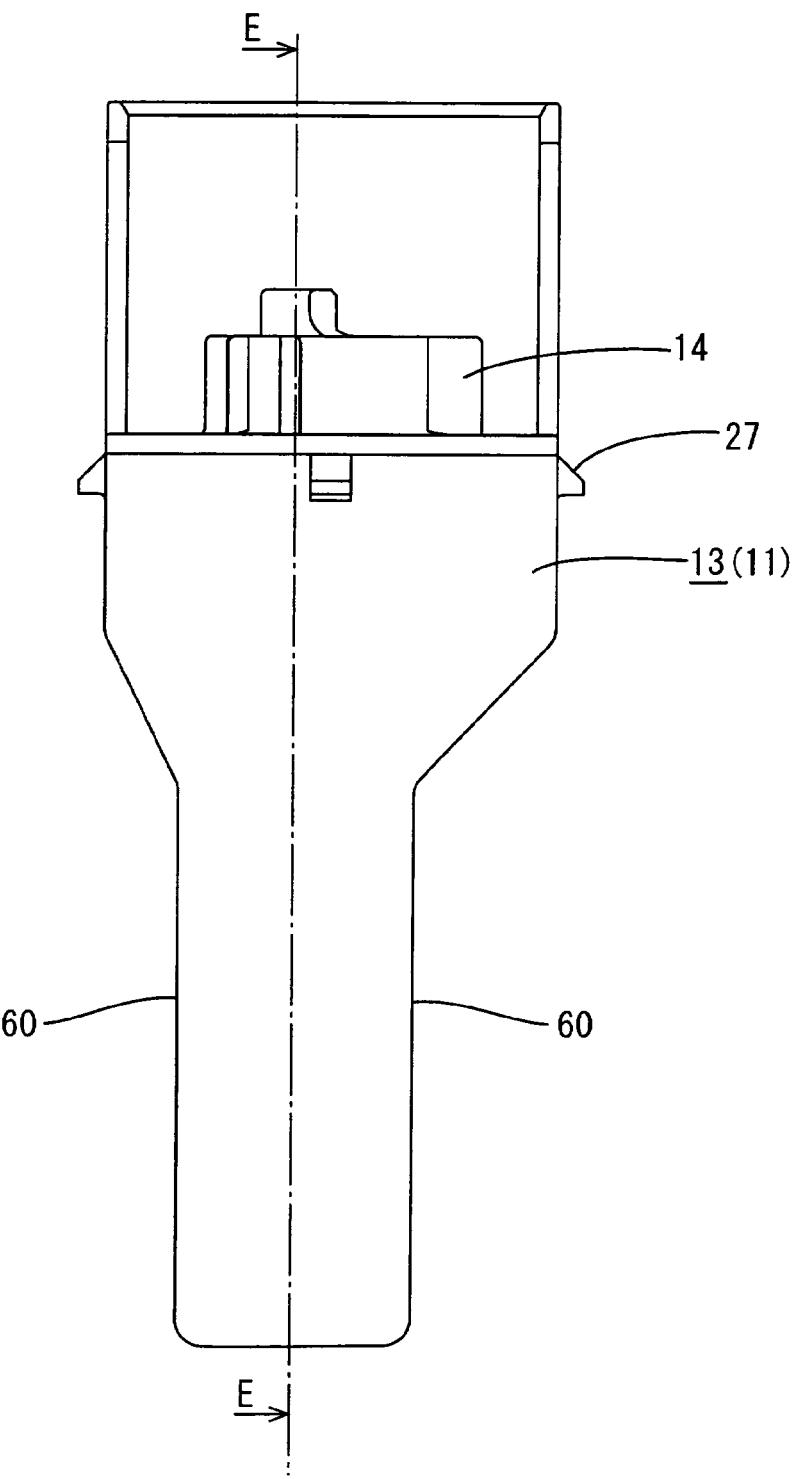
FIG. 9 is a side view illustrating a state where the connector housing and a case are assembled.
Figure 15:
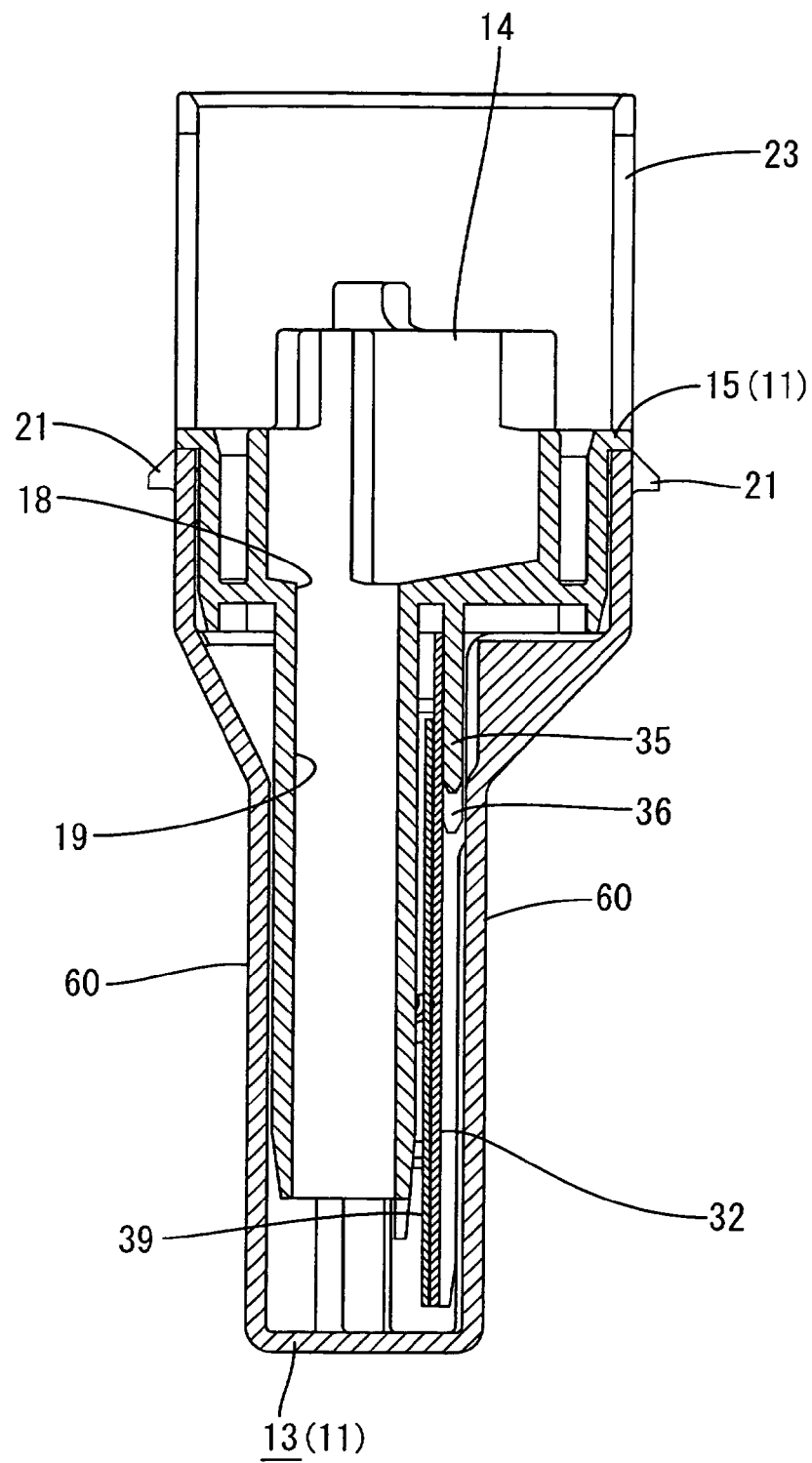
FIG. 15 is a sectional view by F-F line in FIG. 14.

As shown in FIGS. 10 and 15, the filling cylindrical portion 19 is formed in communication with the filling inlet 18 at the main body 30 of the connector housing 15. This filling cylindrical portion 19 is formed so as to overlap the left guide rail 31 in FIG. 6 on the front side in a direction penetrating the figure. The filler material 16 is filled into the case 13 in the attitude with the filling inlet 18 up as shown in FIGS. 9 and 10. The filling cylindrical portion 19 is extended downward in FIG. 10. The lower end edge of the filling cylindrical portion 19 in FIG. 10 is formed extending to the vicinity of the lower wall of the case 13 in FIG. 10. The section of the filling cylindrical portion 19 is substantially in a rectangular shape so that a space can be effectively used in the main body 30 substantially forming a rectangular solid.

Also, as shown in FIG. 6, in a state where the circuit component 12 is assembled to the connector housing 15, the filling cylindrical portion 19 is arranged on a mounted face side (front surface) on which the electronic part 40 is mounted in the circuit board 39.

Also, the filling cylindrical portion 19 guides the connector housing 15 by sliding contact with an inner wall of the filling cylindrical portion accommodation section 62 of the case 13 when the connector housing 15 and the case 13 are assembled.

Figure 11:
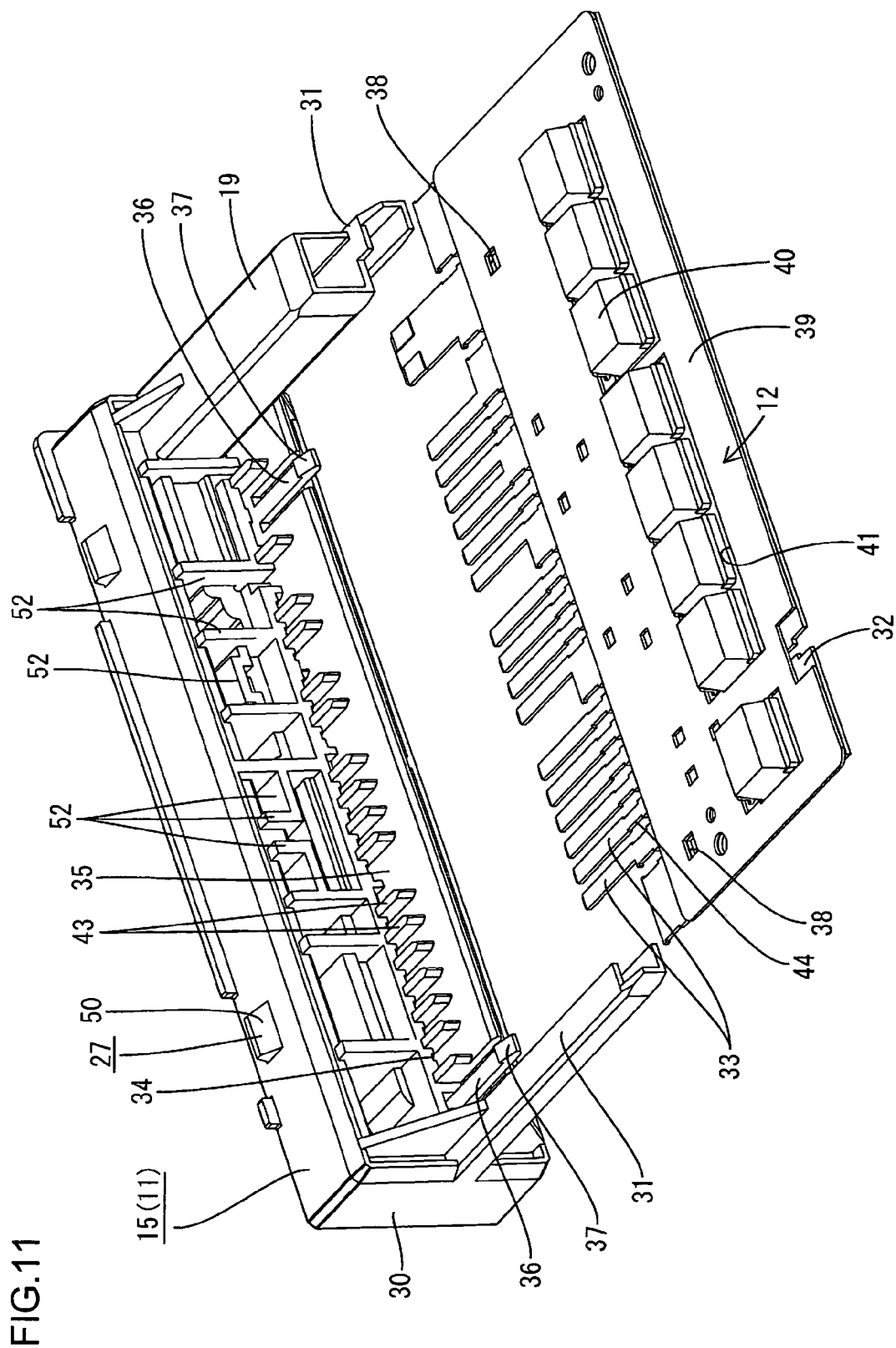
FIG. 11 is a perspective view illustrating a state before the connector housing and the circuit component are assembled.
Figure 12:
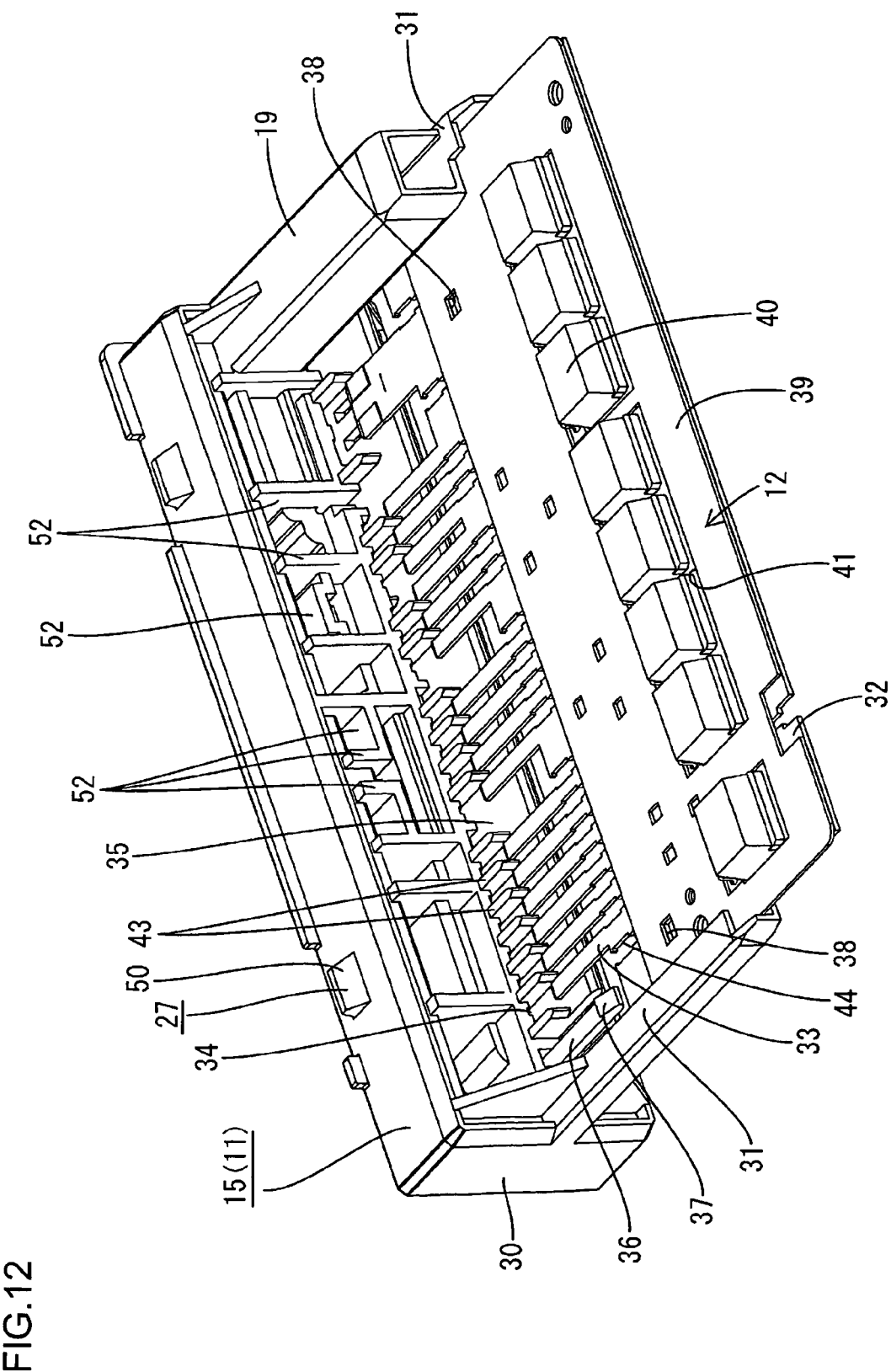
FIG. 12 is a perspective view illustrating a state in the middle of the assembling work of the connector housing and the circuit component.

A manufacturing method for the above described structure will be described below. First, the circuit component 12 is assembled to the connector housing 15. As shown in FIG. 11, both end edges of the circuit board 39 in the circuit component 12 is inserted into the guide rails 31 of the connector housing 15. As the assembling process progresses and when the tip end of the extended portion 33 reaches the receiving plate portion 35 as shown in FIG. 12, the circuit component 12 is further inserted while the extended portion 33 and the receiving plate portion 35 are kept in sliding contact with each other. Then, by being guided by the receiving plate portion 35, the extended portion 33 is inserted into the passage hole 34. As the assembling progresses, the elastic engagement portion 36 of the connector housing 15 is brought into contact with the bus bar 32 and elastically deformed on the back face side of the circuit board 39.

Figure 13:
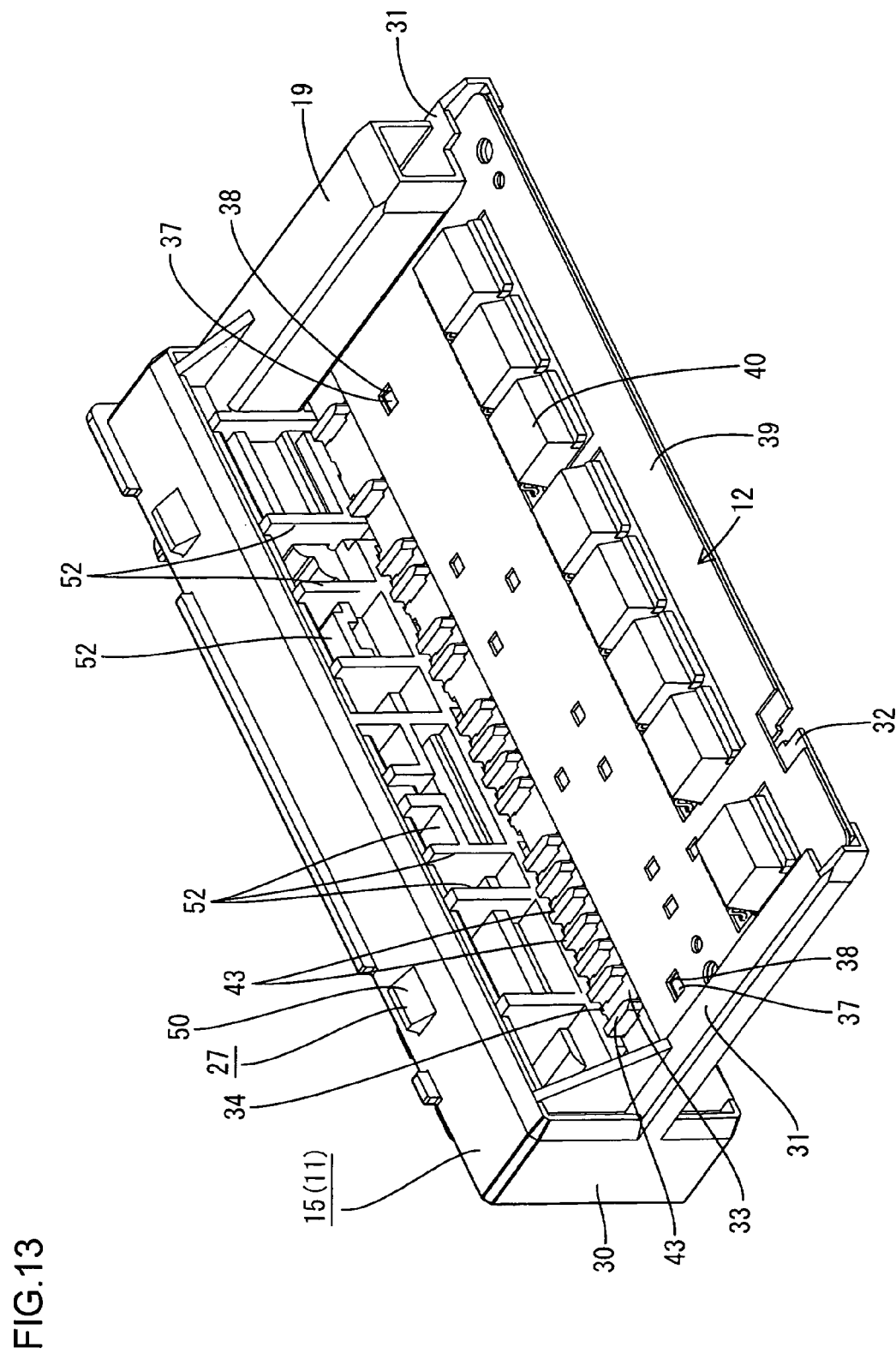
FIG. 13 is a perspective view illustrating a state where the connector housing and the circuit component are assembled.

As shown in FIG. 13, while the circuit component 12 is assembled to the connector housing 15 at a normal position, the elastic engagement portion 36 is returned and deformed. Also, the engagement tongue 37 of the elastic engagement portion 36 is locked by the engagement hole 38 of the circuit component 12. At this time, the extended portion 33 is in contact with the passage hole 34. Since the extended portion 33 is supported by the inner wall surface of the passage hole 34 in this way, the circuit component 12 is prevented from elastic deformation in a direction away from the elastic engagement portion 36. As a result, the circuit component 12 is fixed at the connector housing 15 by the elastic engagement portion 36 integrally formed with the connector housing 15.

Subsequently, the rib 43 is deformed by heating and melting. Then, the rib 43 is brought into close contact with the extended portion 33. And the extended portion 33 is held between the rib 43 and the receiving plate portion 35. Moreover, the rib 43 is engages and contacts the engagement recessed portion 44 formed at the extended portion 33. Thus, the bus bar 32 is fixed to the connector housing 15.

Figure 19:
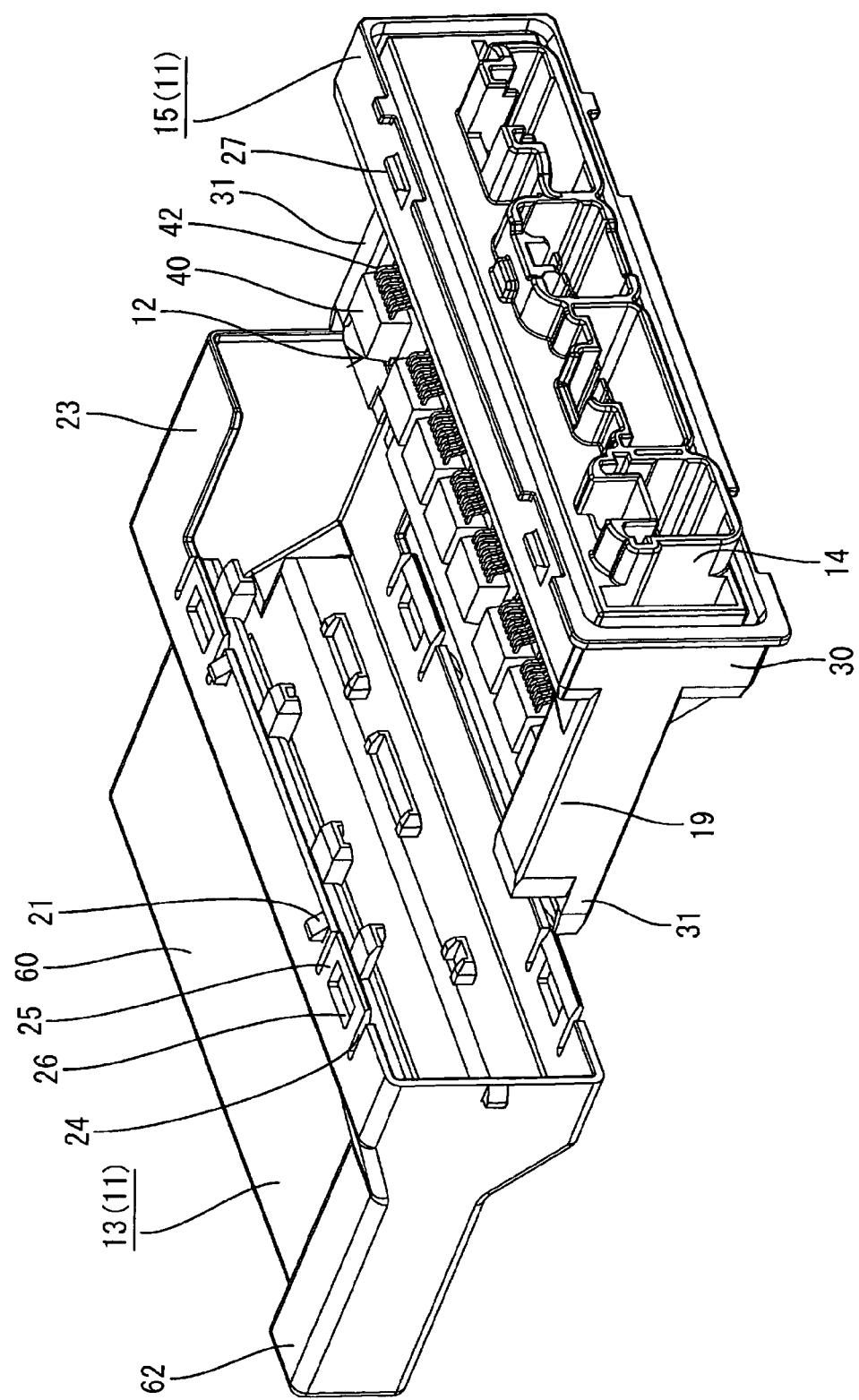
FIG. 19 is a perspective view illustrating a state before the connector housing and the case are assembled.

After that, as shown in FIG. 19, the connector housing 15, to which the circuit component 12 is assembled, is accommodated in the case 13. Then, the guide rail 31 is brought into sliding contact with the inner wall of the guide-rail accommodation portion 63, and the filling cylindrical portion 19 is brought into sliding contact with the inner wall of the filling cylindrical portion accommodation section 62, by which the connector housing 15 is guided into the case 13. As the assembling of the connector housing 15 and the case 13 further progresses, the lock tongue 27 of the connector housing 15 and the elastic lock strike 25 of the case 13 are brought into contact with each other. Further, the elastic lock strike 25 is elastically deflected and then, returned and deformed, and the lock tongue 27 is engaged in the lock recessed portion 26 of the elastic lock strike 25, by which the connector housing 15 and the case 13 are assembled.

In a state where the connector housing 15 and the case 13 are assembled, in the vertical attitude (See FIG. 10) in which the case 13 is on a lower side and the connector housing 15 on an upper side, the liquid-state filler material 16 is filled through the filling inlet 18 of the connector housing 15. Since this filling inlet 18 is formed at the connector housing 15 arranged on the upper side, an interval from the filling inlet 18 to a lower wall of the case 13 in FIG. 10 becomes relatively large, and there is a fear that the filler material 16 is filled in a turbulent flow state, which, for example, may result in trapping air in the filler material 16.

In view of the above circumstances, in the present embodiment, the filling cylindrical portion 19 communicating with the filling inlet 18 has an opening formed in the vicinity of the lower wall in FIG. 10. The filler material 16 flows down from the filling inlet 18 through the filling cylindrical portion 19 into the case 13 from the opening formed in the vicinity of the lower wall of the case 13 in FIG. 10. As a result, since the turbulent flow state of the filler material 16 is regulated, air is not trapped inside the filler material 16 during filling.

The filler material 16, filled through the filling inlet 18, flows out of the opening of the filling cylindrical portion 19. After that, the filler material 16 expands over an inner face of the lower wall of the case 13 in FIG. 10, and the inner face of the lower wall of the case 13 is covered by the filler material 16. As the filler material 16 is further filled, the liquid level of the filler material 16 is raised in contact with the inner face of the side wall of the case 13. By this, a gap is not formed between the filler material 16 and the inner face of the radiation surface 60 of the case 13. The air in the case 13 is pressed by the filler material 16 and escapes from the passage hole 34 of the connector housing 15. By this, the filler material 16 can be smoothly filled into the case 13.

As the filler material 16 is further filled, the entire circuit board 39 sinks in the filler material 16 except the extended portion 33. By this, water proofing and insulation of the circuit component 12 can be ensured. When the liquid level of the filler material 16 reaches the passage hole 34 of the connector housing 15, the filler material 16 flows out of the passage hole 34 into the recessed portion 61. By this, the fact the case 13 is filled with the filler material 16 to a normal amount can be visually checked. When the filler material 16 flows out of the passage hole 34 in this way, filling of the filler material 16 is finished (See FIG. 18). In FIGS. 2 and 3, the recessed portion 61 is fully filled with the filler material 16, but it is not necessary for the recessed portion 61 to be fully filled by the filler material 16 as long as the filler material 16 flows out of the passage hole 34 into the recessed portion 61.

In the state where the case 13 is filled with the filler material 16 to the normal amount, a gap is not formed between the radiation surface 60 of the case 13 and the filler material 16 as mentioned above. As a result, the heat generated from both front and back face sides of the circuit component 12 is transmitted to the filler material 16 and then, transmitted through the filler material 16 to the both radiation surfaces 60 of the case 13 and dissipated from the both radiation surfaces 60 to the outside. In this way, according to this embodiment, since formation of a gap between the filler material 16 and the radiation surfaces 60 can be prevented, heat dissipation capability of the electric connection box can be improved.

When the filler material 16 is filled in the case 13 up to the normal amount, the filler material 16 is solidified. After that, a counterpart is fitted in the hood portion 14. The counterpart is electrically connected to the circuit component 12 by connection with the extended portion 33 projected into the hood portion 14. The cover 17 is assembled from the side where the hood portion 14 of the connector housing 15 is formed. Then, the pawl 21 of the case 13 and the pawl catch 22 of the cover 17 are brought into contact with each other, the pawl 21 is elastically deformed and then, returned and deformed, and the pawl 21 and the pawl catch 22 are elastically engaged with each other, by which the cover 17 and the connector housing 15 are assembled. The electric wire connected to the counterpart is led out from between the wire guiding portion 23 of the connector housing 15 and the wire leading-out port 28 of the cover 17, while the other end of the electric wire is connected to an external circuit, not shown.

As described above, according to this embodiment, since the filler material 16 is filled so as to raise the liquid level while in contact with the insides of the pair of radiation surfaces 60 of the case 13, a gap is not formed between the radiation surfaces 60 of the case 13 and the filler material 16. As a result, the heat generated from the circuit component 12 is not prevented by a gap but transmitted to the radiation surfaces 60 of the case 13 through the filler material 16, and the electric connection box 10 having excellent heat dissipation capability can be manufactured.

Moreover, since it becomes possible to use a surface in a wide flat shape along the body of the circuit component 12 in the case 13 as the radiation surface 60 and the heat generated from the circuit component 12 can be dissipated from the radiation surface 60 to the outside, the heat dissipation capability of the electric connection box 10 can be further improved.

Also, since the extended portion 33 of the bus bar 32 is configured so as not to sink in the filler material 16, by connecting the extended portion 33 and the counterpart to each other, the circuit component 12 can be electrically connected to an external circuit.

Also, the filler material 16 is filled in the case 13 from the end of the filling cylindrical portion 19 formed in communication with the filling inlet 18. Since the filling cylindrical portion 19 is formed extending in a direction to become a bottom portion when the filler material 16 is filled, the filler material 16 is filled from a region close to the portion to be the bottom portion when filling into the case 13. By this, the turbulent flow state of the filler material 13 is restrained. As a result, since air is not caught when the filler material 16 is filled, generation of a cavity in the solidified filler material 16 can be restrained. In this way, according to this embodiment, since drop in heat transmission capability caused by a cavity can be restrained, the heat dissipation capability of the electric connection box 10 can be improved.

Also, when the filler material 16 is filled with the housing 11 in the vertical arrangement as in this embodiment, since a depth dimension from the filling inlet 18 while filling to the bottom portion of the case 13 becomes large, there is a concern that air can be trapped inside of filling material 16. In view of this point, the present embodiment is configured so that the circuit component 12 is accommodated in the case 13 having a face different from the face along the body of the circuit component 12 opened in the housing 11, and the filling inlet 18 and the filling cylindrical portion 19 are formed at the connector housing 15 blocking this opening. By this, even if the housing 11 is vertically arranged and the filler material 16 is filled, the filler material 16 is filled in the case 13 from the region close to the portion to be the bottom surface during the filling, and the trapped air can be further prevented.

Also, in order to mount the electronic part 40 on the circuit board 39, it is necessary to ensure a space for implementation of the electronic part 40 for at least a height dimension of the electronic part 40 in a region on the mounting face side of the electronic part 40 in the circuit board 39. The electronic part 40 is mounted in this space. However, depending on the configuration of the circuit to be connected to the electronic part 40, the size of the electronic part 40 and the like, there is a possibility of creating a region where the electronic part 40 is not mounted, that is, a dead space is generated. In the view of this point, the embodiment is configured so that the filling cylindrical portion 19 is provided on the mounting face side of the electronic part 40, and this dead space can be effectively utilized.

Another Embodiment

The present invention is not limited to the embodiment described above referring to the attached drawings and description but the following embodiments, for example, are also included in the technical scope of the present invention.

(1) In the present embodiment, the housing 11 is arranged vertically and the filler material 16 is filled in the housing 11. But, the present invention is not limited to that, as long as it is possible to raise the liquid level while the filler material 16 is in contact with the insides of the respective radiation surfaces 60, the housing 16 may be arranged in an inclined manner and the filler material 16 is filled in the housing 11.

(2) The housing 11 is comprised by the case 13 in which one of faces along the body of the circuit component 12 is opened and a lid member blocking this opening, and after the circuit component 12 is accommodated in the case 13, the lid member is mounted to the case 13 and filler material 16 is filled in the housing 11 in this state with the housing 11 in the vertical or inclined arrangement.

(3) As another configuration of the circuit component 12, the bus bar is affixed to the connection end of the conducting path formed by print wiring technology on the circuit board 39, for example, the bus bar is extended from the side edge of the circuit board 39, and the filler material may be filled so as to embed the entire circuit board 39 with the extended portion of the bus bar left.

(4) As the filler material 16, various materials such as an epoxy resin, a urethane resin or a silicone resin may be used as long as it can transmit heat generated from the circuit component 12.

(5) The filling inlet 18 may be formed on the surface along the body of the circuit component 12 in the housing 11.

(6) The circuit component 12 may be such that the electronic part 40 is mounted on both front and back face sides of the circuit board 39. In this case, the filling cylindrical portion 19 may be provided on either of the front and back sides of the circuit board 39.

(7) The above embodiment is configured such that the tip end portion of the filling cylindrical portion 19 extends to the vicinity of the bottom wall of the case 13 when filler material 16 is filled, but the present invention is not limited to that. The tip end portion of the filling cylindrical portion 19 may be provided at an various positions in the housing 11 as long as the trapping of air can be prevented during filling of the filler material 16.

What is claimed is:

1. An electric connection box comprising:
    a housing;
    a circuit component positioned in the housing;
    a filler material in the housing and enclosing the circuit component;
    a filling inlet configured to receive the filler material, the filling inlet positioned at an upper part of a wall portion of the housing;
    a filling cylindrical portion formed in the housing and connected to the filling inlet and extending in a direction to a bottom portion of the housing.

2. The electric connection box according to claim 1, wherein the housing further includes a case having a first face positioned adjacent the circuit component.

3. The electric connection box according to claim 2, further including a second face which has an opening and is different from the first face.

4. The electric connection box according to claim 3, further including a lid member movable to block the opening of the second face of the case.

5. The electric connection box according to claim 4, wherein the filler material is filled in the housing in a vertical arrangement with the lid member up, further wherein the filling inlet and the filling cylindrical portion are positioned adjacent the lid member.

6. The electric connection box according to claim 5, wherein the circuit component includes a circuit board and bus bars affixed to the circuit board, further wherein an electronic part is positioned on the circuit board opposite to the bus bars, and the filling cylindrical portion is provided on the side of a mounting face of the electronic part.

7. The electric connection box according to claim 1, wherein the circuit component includes a circuit board and bus bars affixed to the circuit board, further wherein an electronic part is positioned on the circuit board opposite to the bus bars, and the filling cylindrical portion is provided on the side of a mounting face of the electronic part.

8. The electric connection box according to claim 1, wherein the housing includes passage holes configured to allow the filler material pass from inside the housing to outside.

9. The electric connection box according to claim 1, wherein the filing material is a material capable of transmitting heat generated from the circuit component.

* * * * *